US009148439B2

(12) United States Patent
Hon et al.

(10) Patent No.: US 9,148,439 B2
(45) Date of Patent: Sep. 29, 2015

(54) METHOD FOR PREDICTING AND DETECTING NETWORK INTRUSION IN A COMPUTER NETWORK

(71) Applicant: Macau University of Science and Technology, Taipa (MO)

(72) Inventors: Chi Tin Hon, Taipa (MO); Jia Hua Xu, Taipa (MO)

(73) Assignee: MACAU UNIVERSITY OF SCIENCE AND TECHNOLOGY, Taipa (MO)

( * ) Notice: Subject to any disclaimer, the term of this patent is extended or adjusted under 35 U.S.C. 154(b) by 0 days.

(21) Appl. No.: 14/201,942

(22) Filed: Mar. 10, 2014

(65) Prior Publication Data

US 2015/0156211 A1    Jun. 4, 2015

(30) Foreign Application Priority Data

Nov. 29, 2013   (AU) .............................. 2013101573

(51) Int. Cl.

| G06F 21/55 | (2013.01) |
|---|---|
| H04L 29/06 | (2006.01) |
| H04L 12/24 | (2006.01) |
| H04L 12/26 | (2006.01) |

(52) U.S. Cl.
CPC ............ *H04L 63/1408* (2013.01); *G06F 21/55* (2013.01); *H04L 41/147* (2013.01); *H04L 63/1416* (2013.01); *H04L 63/1425* (2013.01); *H04L 63/1441* (2013.01); *H04L 63/20* (2013.01)

(58) Field of Classification Search
CPC ............ H04L 63/1408; H04L 63/1416; H04L 63/1425; H04L 63/1441; H04L 63/20; H04L 41/147; G06F 21/55
See application file for complete search history.

(56) References Cited

U.S. PATENT DOCUMENTS

| 5,056,058 | A | * | 10/1991 | Hirata et al. ................... 709/230 |
|---|---|---|---|---|
| 5,260,942 | A | * | 11/1993 | Auerbach et al. .............. 370/474 |
| 5,758,142 | A | * | 5/1998 | McFarling et al. ............ 712/239 |
| 6,622,173 | B1 | * | 9/2003 | Luke ............................. 709/237 |
| 6,819,681 | B1 | * | 11/2004 | Hariharasubrahmanian . 370/498 |
| 6,961,777 | B1 | * | 11/2005 | Hariharasubrahmanian . 709/230 |
| 8,072,980 | B1 | * | 12/2011 | Zhang et al. ................... 370/392 |
| 8,300,532 | B1 | * | 10/2012 | Venkatramani et al. ...... 370/235 |
| 8,467,391 | B1 | * | 6/2013 | Zhang et al. ................... 370/392 |
| 2003/0028666 | A1 | * | 2/2003 | Hanner .......................... 709/238 |
| 2003/0041168 | A1 | * | 2/2003 | Musoll .......................... 709/238 |
| 2004/0117478 | A1 | * | 6/2004 | Triulzi et al. ................. 709/224 |
| 2005/0060295 | A1 | * | 3/2005 | Gould et al. ...................... 707/3 |

(Continued)

*Primary Examiner* — Michael Simitoski
(74) *Attorney, Agent, or Firm* — Eagle IP Limited; Jacqueline C. Lui

(57) ABSTRACT

A method of detecting an internet attack against a computing device is disclosed. The method of detecting an internet attack against a computing device comprising the steps of receiving a plurality of incoming network packets; extracting a plurality of incoming feature packets based on the plurality of incoming network packets; predicting a predicted incoming feature packet based on the plurality of incoming feature packets; obtaining a first classification data based on one of the incoming feature packets using a first classifier; obtaining a second classification data based on the predicted incoming feature packet by using a second classifier; and performing at least one remedy action if the first classification data or the second classification data identifies the internet intrusion attack; wherein each of the plurality of incoming feature packets and the predicted incoming feature packet comprise a plurality of incoming features and a plurality of predicted features respectively.

5 Claims, 3 Drawing Sheets

(56) References Cited

U.S. PATENT DOCUMENTS

| | | | |
|---|---|---|---|
| 2005/0210533 A1* | 9/2005 | Copeland et al. | 726/23 |
| 2006/0133377 A1* | 6/2006 | Jain | 370/392 |
| 2007/0121517 A1* | 5/2007 | Albrecht et al. | 370/242 |
| 2010/0002635 A1* | 1/2010 | Eklund | 370/329 |
| 2012/0278890 A1* | 11/2012 | Maatta et al. | 726/23 |
| 2012/0284791 A1* | 11/2012 | Miller et al. | 726/22 |
| 2013/0136127 A1* | 5/2013 | Hill et al. | 370/392 |
| 2013/0272198 A1* | 10/2013 | Azizi et al. | 370/328 |
| 2014/0298457 A1* | 10/2014 | Lee et al. | 726/22 |
| 2015/0101047 A1* | 4/2015 | Sridhara et al. | 726/23 |

* cited by examiner

METHOD FOR PREDICTING AND DETECTING NETWORK INTRUSION IN A COMPUTER NETWORK

CROSS-REFERENCE TO RELATED APPLICATION

The present application claims priority under 35 U.S.C. §119 to Innovation Australian Patent Application No. 2013-101573 filed on Nov. 29 2013. The content of the application is incorporated herein by reference in its entirety.

FIELD OF INVENTION

This invention relates to a method of detecting internet intrusion based on a predicted incoming feature packet.

BACKGROUND OF INVENTION

Our everyday activities rely heavily on the internet. For example, e-mail and e-commerce are all depended on the internet. Undoubtedly, the internet is now becoming more and more important to all of us. With the rise of internet use, numbers of internet attacks have also increased dramatically. As a result, network security has become increasingly important. A robust internet intrusion detection system is vital component to an effective network security system. Conventional internet intrusion detection system and/or method only check if an incoming network packet is a potential threat to a computing device. If it turns out to be a real threat, it may be too late for the network security system to act in order to protect the computing. Since hackers continue to alter their attacks, some attacks may not contain the attack features that are known to the internet intrusion detection system and/or method. Accordingly, there is a need for a system and/or method to improve internet intrusion detection in order to enhance network security.

SUMMARY OF INVENTION

In the light of the foregoing background, it is an object of the present invention to provide an alternate intrusion detection algorithm which is based on predicting at least one future incoming data packet based on incoming data packets.

Accordingly, the present invention is a method of detecting an internet attack against a computing device comprising the steps of receiving a plurality of incoming network packets; extracting a plurality of incoming feature packets based on the plurality of incoming network packets; predicting a predicted incoming feature packet based on the plurality of incoming feature packets; obtaining a first classification data based on one of the incoming feature packets using a first classifier; obtaining a second classification data based on the predicted incoming feature packet by using a second classifier; and performing at least one remedy action if the first classification data or the second classification data identifies an internet intrusion attack; wherein each of the plurality of incoming feature packets and the predicted incoming feature packet comprise a plurality of incoming features and a plurality of predicted features respectively.

In one embodiment, the step of predicting the predicted incoming feature packet is done by carrying out a linear regression to the plurality of incoming features.

In yet another embodiment, the first classifier and the second classifier are both support vector machine.

In yet another embodiment, a step of predicting the type of the internet attack based on the second classification data.

In yet another embodiment, the plurality of incoming feature packets are obtained from a buffer that has 100 slots to hold said incoming feature packets.

There are many advantages in this present invention. Firstly, the present invention is capable to predict potential intrusion attack before the incoming network packet actually arrives. This allows the system or the computer device that this system protects to take immediate action to counter the attack. Secondly, as can be seen below, the look-ahead intrusion detection module performs very well in anomaly network packet detection.

DETAILED DESCRIPTION OF THE PREFERRED EMBODIMENTS

As used herein and in the claims, "comprising" means including the following elements but not excluding others.

Figure 1:
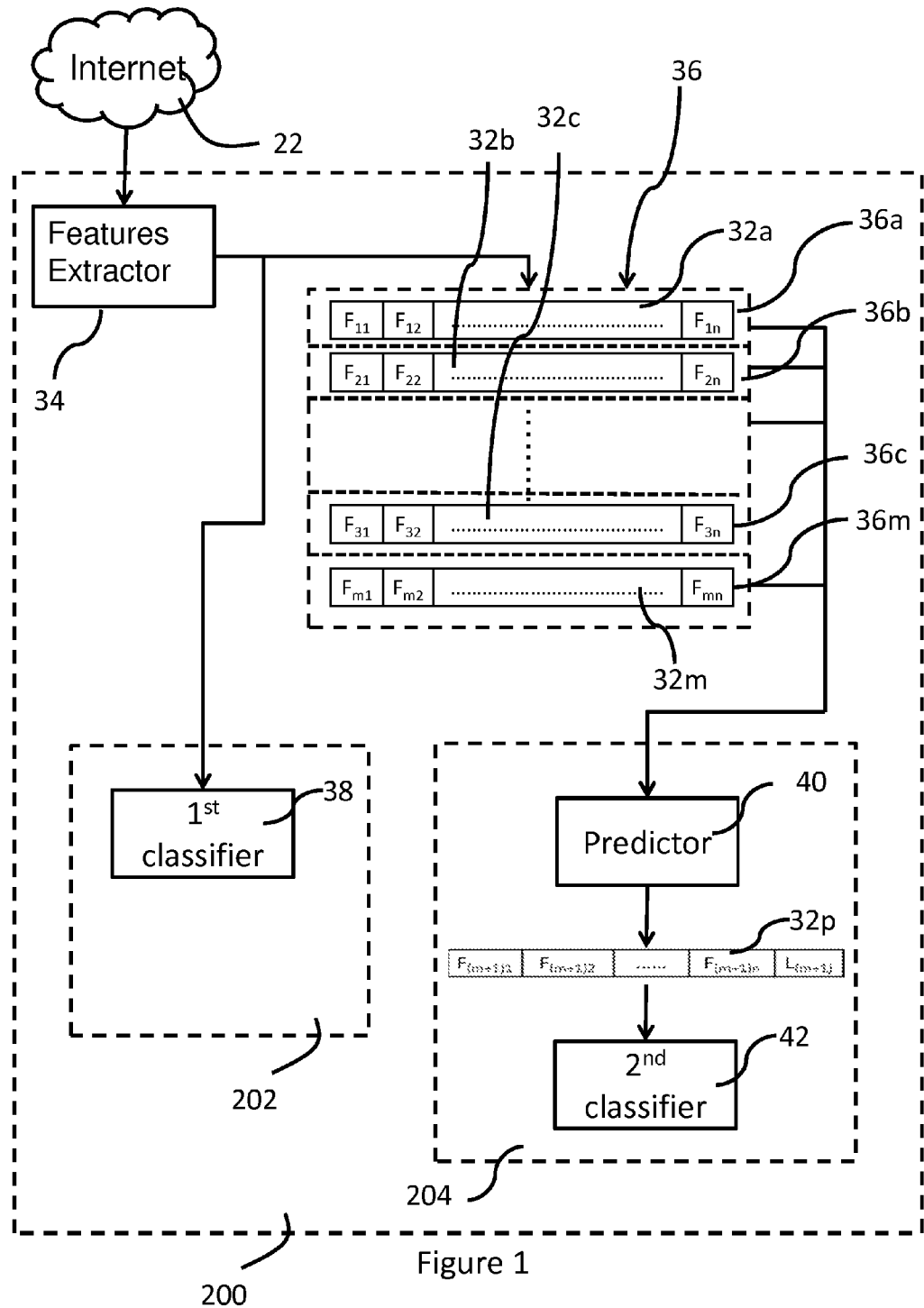
FIG. 1 illustrates an internet intrusion detection system according to one embodiment of the present invention.

FIG. 1 illustrates an internet intrusion detection system 200 for one embodiment of the present invention. The internet instruction detection system 200 is installed in between an internet connection between a computing device and the internet. As shown in FIG. 1, the internet intrusion detection system 200 comprises a features extractor module 34, a first in first out (FIFO) buffer 36, a current frame intrusion detection module 202 and a look-ahead intrusion detection module 204. The current frame intrusion detection module 202 further comprises a first classifier 38 and the look-ahead intrusion detection module 204 further comprises a predictor 40 and a second classifier 42. The internet intrusion detection system 200 at one end is connected to the internet 22, which transmits incoming network packets to the internet intrusion detection system 200. At the other end, the internet instruction detection system 200 is directly or indirectly connected to the computing device. Each of the incoming network packets is forwarded to the features extractor module 34 to extract an incoming feature packet 32 from each of the incoming network packets. The incoming feature packet 32 comprises a plurality of features that are relevant for intrusion detection. In one embodiment, the incoming feature packet 32a has n incoming features of $F_{11}, F_{12}, \ldots, F_{1n}$. Each of the incoming feature packets 32 is fed to the current frame intrusion detection module 202 and also to the FIFO (First-in First-out) buffer 36, which comprises a plurality of slots 36a, 36b, ..., 36c, 36m. Each of the slots is configured to receive one incoming feature packet 32. The first slot 36a of the buffer 36 firstly receives the first incoming feature packet 32a, which will then be moved to the second slot 36b when the second incoming feature packet is received. As such, the slots of the buffer 36a, 36b, ..., 36c, 36m are filled up as the incoming feature packets are received. Once the buffer 36 is filled up, all the incoming feature packets 32a, 32b, ..., 32c, 32m in all the slots of the buffer 36a, 36b, ..., 36c, 36m are fed into the predictor 40 to compute a predicted incoming feature packet 32p, which will then be fed into the second classifier 42 of the look-ahead intrusion detection module 204. In one embodiment, the predictor 40 is a one-step look-ahead predictor and the predicted feature packet 32p estimates the next feature packet corresponding to the next incoming network packets expected to be received from the Internet. In one embodiment, the first classifier 38 and the second classifier 42 is an optimized support vector machine (SVM). In a further embodiment, the two classifiers are the same.

Figure 2:
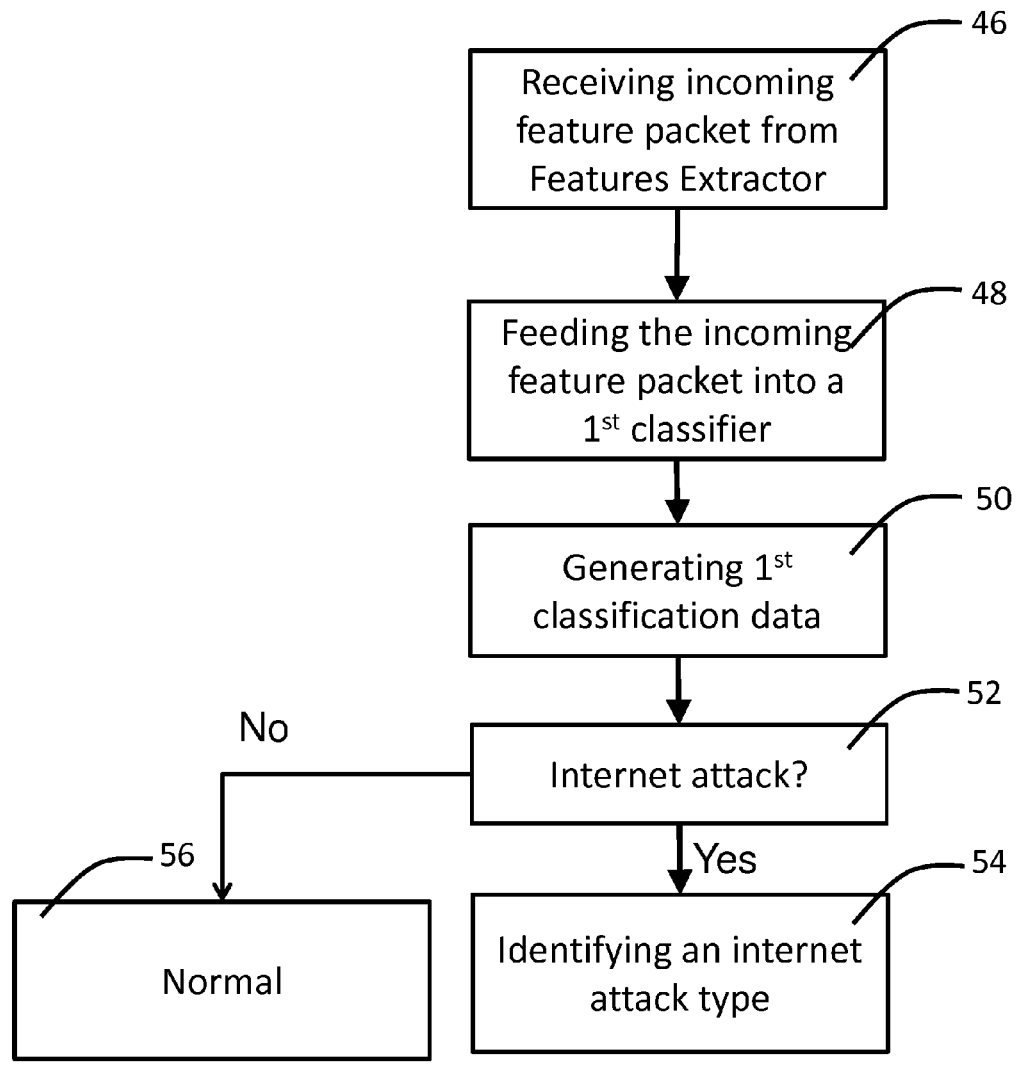
FIG. 2 shows a flow chart illustrating the operation of a current frame intrusion detection module according to one embodiment of the present invention.

Now turning to FIG. 2, which shows a flow chart illustrating the operation of the current frame intrusion detection module 202. To perform intrusion detection, the incoming feature packet from the output of the feature extractor 34 is fed to the first classifier 38 of current frame intrusion detection module 202 in steps 46 and 48. The first classifier 38 generates a first classification data based on at least one feature in the incoming feature packet in step 50. As soon as the first classification data is obtained, the first classifier 38 determines if the incoming feature packet is a threat to the computing device based on the first classification data in step 52. Thus, the system can determine whether the corresponding incoming network packet is an internet attack. Further, if the first classifier 38 determines that the incoming feature packet is a threat, it identifies the type of the internet attack based on the first classification data in step 54. In an embodiment, the first classifier 38 identifies four types of attacks, namely Denial-of-service attack (DOS) (e.g. syn flood), surveillance and other probing (Probe) (e.g. port scanning), unauthorized access from a remote machine (R2L) (e.g. guessing password) and unauthorized access to local superuser (root) privileges (U2R) (e.g. various "buffer overflow" attacks). Thereafter, the system 200 will perform one or more remedy actions to protect the computing device from the internet attack. In one embodiment, the system 200 cut the internet connection between the computing device and the internet 22. In another embodiment, the system 200 sends a warning signal to the user and informs him the type of the internet attack. If the current frame intrusion detection module 202 does not find that the incoming feature packet is a threat, the system will not block the internet connection established between the computing device and the internet.

Figure 3:
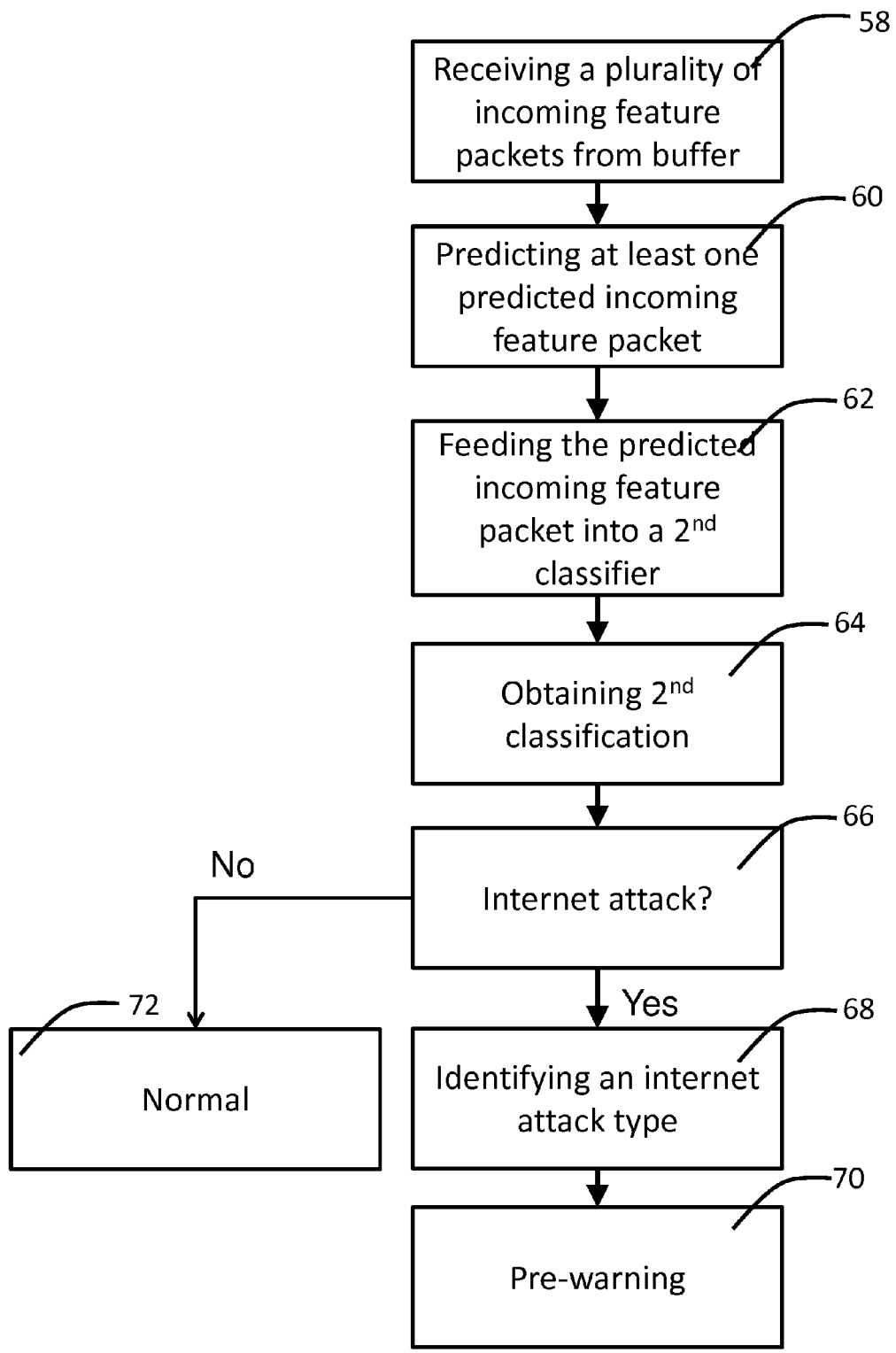
FIG. 3 shows a flow chart illustrating the operation of a look-ahead intrusion detection module according to one embodiment of the present invention.

Now turning to FIG. 3, which shows a flow chart illustrating the operation of the look-ahead intrusion detection module 204. As the incoming feature packets 32 are received, the slots of the buffer 36a, 36b, ..., 36c, 36m are filled up. Once the buffer 36 is filled up, all the incoming feature packets 32a, 32b, ..., 32c, 32m in all the slots of the buffer 36a, 36b, ..., 36c, 36m are fed to the look-ahead intrusion detection module 204, which is further fed into the predictor 40 to compute the predicted incoming feature packet 32p in step 58. In one embodiment, the buffer 36 has 100 slots for holding 100 incoming feature packets 32. In step 60, at least one predicted incoming feature packet 32p is predicted based on a plurality of the features in a plurality of the incoming feature packets 32a, 32b, ..., 32c, 32m in all the slots of the buffer 36a, 36b, ..., 36c. The predicted incoming feature packet 32p has n predicted features of $F_{(m+1)1}, F_{(m+1)2}, \ldots, F_{(m+1)n}$. In one embodiment, the predictor 40 uses linear regression to predict the predicted incoming feature packet 32p. Specifically, the predicted features are predicted by using linear regression to a plurality of incoming features in all the incoming feature packets 32a, 32b, ..., 32c, 32m in all the slots of the buffer 36a, 36b, ..., 36c, 36m. After the predicted incoming feature packet 32p is obtained, it is forwarded to the second classifier 42 in step 62. A second classification data is obtained based on the features in the predicted incoming feature packet 32p by the second classifier 42 in step 64. The second classifier 42 then determines if the predicted incoming feature packet 32p is a threat based on at least one the predicted feature in step 66. If the second classifier determines that the predicted incoming feature packet 32p is a threat to the computing device, the second classifier 42 identifies the type of the internet attack based on the second classification data in step 68. Thereafter, the system 200 will perform one or more remedy actions to protect the computing device. In one embodiment, the look-ahead intrusion detection module 204 may send a pre-warning signal to the user and informs him the type of the internet attack as shown in step 70. In a further embodiment, the pre-warning signal are similar to the remedy actions discussed in the previous paragraph. For example, the system 200 may cut off the internet connection between the computing device and the internet 22. If the look-ahead intrusion detection module 204 does not find that the predicted incoming feature packet 32p is a threat, the system will not block the internet connection established between the computing device and the internet.

The current frame intrusion detection module 202 and the look-ahead intrusion detection module 204 are running concurrently after the buffer is fully filled. In one embodiment, the system 200 sends a warning signal and/or informs a user the type of attack if either the current frame intrusion detection module 202 or the look-ahead intrusion detection module 204 determines there is a potential internet attack. As such, this system improves internet intrusion detection in order to enhance network security by providing protection to the computing device by predicting the predicted incoming feature packet 32p.

The following table 1 shows different features that can be included in a feature packet (i.e. incoming feature packet or predicted incoming feature packet).

TABLE 1

| Features that can be included in a feature packet | |
|---|---|
| Order | Features |
| 1 | count |
| 2 | service |
| 3 | src_bytes |
| 4 | srv_count |
| 5 | dst_host_same_src_port_rate |
| 6 | protocol_type |
| 7 | dst_host_srv_count |
| 8 | dst_host_diff_srv_rate |
| 9 | dst_host_same_srv_rate |
| 10 | diff_srv_rate |
| 11 | same_srv_rate |
| 12 | flag |
| 13 | dst_bytes |
| 14 | dst_host_serror_rate |
| 15 | serror_rate |
| 16 | dst_host_srv_serror_rate |
| 17 | srv_serror_rate |
| 18 | logged_in |
| 19 | dst_host_count |
| 20 | dst_host_srv_diff_host_rate |
| 21 | Srv_diff_host_rate |
| 22 | dst_host_rerror_rate |
| 23 | dst_host_srv_rerror_rate |
| 24 | rerror_rate |
| 25 | srv_rerror_rate |
| 26 | duration |
| 27 | hot |
| 28 | num_compromised |
| 29 | wrong_fragment |
| 30 | is_guest_login |
| 31 | num_root |
| 32 | num_access_files |
| 33 | num_file_creations |
| 34 | num_failed_logins |
| 35 | root_shell |
| 36 | land |
| 37 | num_shells |

TABLE 1-continued

Features that can be included in a feature packet

| Order | Features |
|---|---|
| 38 | urgent |
| 39 | su_attempted |
| 40 | num_outbound_cmds |
| 41 | is_host_login |

In one embodiment, a subset of twelve features is judiciously selected to form the feature packet. In yet another embodiment, the method to classify internet intrusions implemented by the first classifier 38 and second classifier 42 is the method disclosed in Australian Innovation Patent Application number: 2013101474 filed on 12 Nov. 2013, which is hereby incorporated by reference.

The KDD Experiment

To better illustrate the methodology of the present invention, an example of applying the above methodology on the KDD is given. KDD is a database provided by the 1998 DARPA Intrusion Detection Evaluation Program. It was prepared and managed by MIT Lincoln Labs. The objective is to survey and to evaluate research in intrusion detection. A standard set of data to be audited, which includes a wide variety of intrusions simulated in a military network environment, was provided. The 1999 KDD intrusion detection contest uses a version of this dataset. The competition task was to build a network intrusion detector, a predictive model capable of distinguishing between "bad" connections, called intrusions or attacks and "good" normal connections. This database contains a standard set of data to be audited, which includes a wide variety of intrusions simulated in a military network environment.

The KDD dataset consists of four major categories: (1) denial-of-service (DOS), e.g. SYN flood; (2) unauthorized access from a remote machine (R2L), e.g. guessing password; (3) unauthorized access to local super user (root) privileges (U2R), e.g. various "buffer overflow" attacks and (4) probing, e.g. surveillance and port scanning. Each labeled record consisted of 41 and one target value (i.e. the label). The target value indicates the attack category name There are around 10 percent of 5 million (4,898,430) records in the labeled dataset, and unlabeled attacks fall into the aforesaid four categories.

The following table shows the accuracy in recognizing internet attacks by the intrusion diagnosis of KDD99 Cup winner.

TABLE 2

Attack Recognition Accuracy of the KDD99 Cup Winner

| | | Predication | | | | | |
|---|---|---|---|---|---|---|---|
| | | Normal | Probe | Dos | U2R | R2L | Accuracy |
| Actual | Normal | 60262 | 243 | 78 | 4 | 6 | 99.50% |
| | Probe | 511 | 3471 | 184 | 0 | 0 | 83.30% |
| | Dos | 5299 | 1328 | 223226 | 0 | 0 | 97.10% |
| | U2R | 168 | 20 | 0 | 30 | 10 | 13.20% |
| | R2L | 14527 | 294 | 0 | 8 | 1360 | 8.40% |

The following table shows the accuracy in recognizing internet attacks by the look-ahead intrusion detection module 204 according to one embodiment of the present invention.

TABLE 3

Attack Recognition Accuracy of the look-ahead intrusion detection module

| | | Predication | | | | | |
|---|---|---|---|---|---|---|---|
| | | Normal | Probe | Dos | U2R | R2L | Accuracy |
| Actual | Normal | 10789 | 602 | 25135 | 1306 | 22682 | 17.70% |
| | Probe | 432 | 2340 | 976 | 121 | 297 | 56.10% |
| | Dos | 8424 | 712 | 215794 | 4493 | 430 | 93.80% |
| | U2R | 39 | 0 | 111 | 14 | 64 | 6.00% |
| | R2L | 3697 | 824 | 7924 | 1216 | 2505 | 15.40% |

Table 3 shows that the look-ahead intrusion detection module 204 has high improvement in recognizing attack of DOS and R2L compared to other conventional internet intrusion systems.

The following table shows the accuracy in recognizing internet attacks by the current frame intrusion detection module 202 according to one embodiment of the present invention.

TABLE 4

Attack Recognition Accuracy of the current frame intrusion detection module

| | | Predication | | | | | |
|---|---|---|---|---|---|---|---|
| | | Normal | Probe | Dos | U2R | R2L | Accuracy |
| Actual | Normal | 59173 | 465 | 674 | 123 | 156 | 97.60% |
| | Probe | 187 | 3090 | 224 | 140 | 525 | 74.10% |
| | Dos | 7278 | 534 | 221036 | 349 | 656 | 96.10% |
| | U2R | 12 | 0 | 0 | 210 | 6 | 92.10% |
| | R2L | 14001 | 17 | 16 | 148 | 2007 | 12.10% |

Table 4 shows that the current frame intrusion detection module 202 has improvement in recognizing attack of U2R and R2L compared to conventional internet intrusion systems.

When compared to the attack recognition accuracy of the KDD99 Cup Winner, both current frame intrusion detection module 202 and look-ahead intrusion detection module 204 according to one embodiment of the present invention have a better accuracy in detecting R2L type attack.

The performance of the current frame intrusion detection module 202 is also compared with other algorithms, such as basis net, native basis, SMO, random tree, J48 and BF tree etc. The comparison is shown in table 5:

TABLE 5

Accuracy comparison of present invention with other algorithms

| | Probe | Dos | U2R | R2L |
|---|---|---|---|---|
| Current frame intrusion detection module | 74.10% | 96.10% | 92.10% | 12.10% |
| Kdd winner | 83.30% | 97.10% | 13.20% | 8.40% |
| Native basis | 75.70% | 90.50% | 72.80% | 10.66% |
| Basis net | 75.50% | 94.80% | 14.90% | 11.60% |
| Liblinear | 73.09% | 82% | 17.90% | 7.20% |
| Logistics | 74.96% | 96.10% | 73.20% | 9.30% |
| SMO | 73.09% | 92.02% | 89.90% | 8.65% |
| DNTB | 73.74% | 96.02% | 35.51% | 8.90% |
| kip | 72.87% | 96.28% | 11.40% | 9.60% |
| OneR | 83.90% | 71.90% | 17.50% | 10% |
| PART | 77.70% | 96.10% | 67.10% | 8.60% |
| Radom forest | 75.20% | 96.30% | 66.22% | 11.59% |
| Random tree | 79.60% | 96.10% | 13.50% | 11.40% |

TABLE 5-continued

Accuracy comparison of present invention with other algorithms

|         | Probe  | Dos    | U2R    | R2L    |
|---------|--------|--------|--------|--------|
| J48     | 80.46% | 96.20% | 79.10% | 8.55%  |
| Bf tree | 73.95% | 83.78% | 14.79% | 10.20% |
| REP tree| 79.60% | 96.10% | 13.50% | 11.40% |

The NSL-KDD Experiment

The KDD data set is found to contain a huge number of redundant records. The classifiers that are trained based on this data set will be biased towards those (normal or abnormal) classes that have more training records. Some harmful attacks, such as U2R and R2L are not equally represented in this data set. So the evaluation results may not reflect the true performance of the intrusion detection system. As a result, an alternative data set—NSL-KDD data set, is chosen for the performance evaluation.

The following tables show the results of both the frame intrusion detection module 202 and the look-ahead intrusion detection module 204 for normal/anomaly classification on the NSL-KDD data set. This data set is used to train and test both modules. As mentioned previously, both of the first and second classifiers in the respective modules are support vector machines (SVMs) while the predictor in the look-ahead intrusion detection module 204 uses linear regression.

TABLE 6

Accuracy comparison of current frame intrusion detection module

|         | Normal | Anomaly | Accuracy |
|---------|--------|---------|----------|
| Normal  | 8886   | 825     | 91.5%    |
| Anomaly | 3037   | 9796    | 76.3%    |

TABLE 7

Accuracy comparison of look-ahead intrusion detection module

|         | Normal | Anomaly | Accuracy |
|---------|--------|---------|----------|
| Normal  | 343    | 9317    | 3.5%     |
| Anomaly | 489    | 12295   | 95.8%    |

As can be seen in the aforementioned tables, the current frame intrusion detection module 202 performs well on the normal feature packet while the look-ahead intrusion detection module 204 yields very good detection on anomaly feature packets.

As the look-ahead intrusion detection module 204 gives one step look-ahead prediction, and since it has high accuracy in anomaly detection, its prediction can be used as a pre-warning of potential intrusion attack so that attention can be focused on subsequent network packets entering to the intrusion detection system.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls the internet intrusion detection system 200 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Internet intrusion detection system 200 generally comprises central processing unit (CPU), memory, bus, input/output (I/O) interfaces, external devices/resources and database. CPU may comprise a single processing unit, or be distributed across one or more processing units in one or more locations. Memory may comprise any known type of data storage and/or transmission media, including magnetic media, optical media, random access memory (RAM), read-only memory (ROM), a data cache, a data object, etc. Moreover, similar to CPU, memory may reside at a single physical location, comprising one or more types of data storage, or be distributed across a plurality of physical systems in various forms.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

What is claimed is:

1. A method of detecting an internet attack against a computing device comprising the steps of:
   a) receiving a plurality of incoming network packets;
   b) extracting a plurality of incoming feature packets based on said plurality of incoming network packets;
   c) predicting a predicted incoming feature packet based on said plurality of incoming feature packets;
   d) obtaining a first classification data based on one of said incoming feature packets using a first classifier;
   e) obtaining a second classification data based on said predicted incoming feature packet by using a second classifier; and
   f) performing at least one remedy action if said first classification data or said second classification data identifies said internet intrusion attack;
   wherein each of said plurality of incoming feature packets and said predicted incoming feature packet comprise a plurality of incoming features and a plurality of predicted features respectively.

2. The method of claim 1, wherein said step of predicting said predicted incoming feature packet is done by carrying out a linear regression to said plurality of incoming features.

3. The method of claim 2, wherein said first classifier and said second classifier are both support vector machine 4. The method of claim 3 further comprises a step of predicting the type of said internet attack based on said second classification data.

5. The method of claim 1, wherein said plurality of incoming feature packets are obtained from a buffer that has 100 slots to hold said incoming feature packets.

\* \* \* \* \*